United States Patent

Sukeshita et al.

Patent Number: 5,188,001
Date of Patent: Feb. 23, 1993

[54] ACCELERATOR PEDAL DEVICE

[75] Inventors: Kazumi Sukeshita, Sagamihara; Takayuki Tomikawa, Zama; Yasuyuki Ikegami, Kosai, all of Japan

[73] Assignees: Nissan Motor Co., Ltd., Yokohama; Fuji Kiko Co., Ltd., Tokyo, both of Japan

[21] Appl. No.: 798,317

[22] Filed: Nov. 26, 1991

[30] Foreign Application Priority Data

Nov. 30, 1990 [JP] Japan .................. 2-338764

[51] Int. Cl.⁵ ............................. G05G 1/14
[52] U.S. Cl. ........................ 74/560; 74/513; 192/0.073; 192/0.092; 200/61.89; 200/86.5
[58] Field of Search .............. 74/560, 513, 512; 192/0.073, 0.092, 99 R; 200/61.89, 86.5

[56] References Cited

U.S. PATENT DOCUMENTS

| | | | |
|---|---|---|---|
| 2,178,343 | 10/1939 | Hebler | 200/61.89 |
| 3,313,897 | 4/1967 | Gorsky | 200/61.89 |
| 3,846,599 | 11/1974 | Fontaine | 74/560 X |
| 4,115,671 | 9/1978 | Iijima | 200/61.89 X |
| 4,237,752 | 12/1980 | Hildebrecht | 74/513 X |
| 4,875,385 | 10/1989 | Sitrin | 74/560 X |
| 4,915,075 | 4/1990 | Brown | 74/513 X |
| 5,078,024 | 1/1992 | Cicotte et al. | 74/512 |

FOREIGN PATENT DOCUMENTS 59-21057 6/1984 Japan .

Primary Examiner—Leslie A. Braun
Assistant Examiner—Andrea Pitts
Attorney, Agent, or Firm—Lowe, Price, LeBlanc & Becker

[57] ABSTRACT

An accelerator pedal device comprises a pedal lever having a pivot shaft which is pivotally supported by a fixed support bracket. The pedal lever is biased in such a direction that an upper part of the pedal lever approaches a fixed stopper member. A first auxiliary lever is pivotally supported by the pivot shaft and has a first upper portion located between the stopper member and the upper part of the pedal lever. A second auxiliary lever is pivotally supported by the pivot shaft and has a second upper portion located between the first upper portion and the upper part of the pedal lever. A first lost-motion mechanism is provided between the pedal lever and the second auxiliary lever, and a second lost-motion mechanism is provided between the second and first auxiliary levers. A first switch is arranged to be actuated when an intersection angle between the pedal lever and the second auxiliary lever becomes smaller than a first given angle and a second switch is arranged to be actuated when an intersection angle between the second and first auxiliary levers becomes smaller than a second given angle.

13 Claims, 2 Drawing Sheets

ACCELERATOR PEDAL DEVICE

BACKGROUND OF THE INVENTION

1. Field of the Invention

The present invention relates to accelerator pedal devices for a wheeled motor vehicle, and more particularly to accelerator pedal devices of a type which is constructed to accurately operate switches incorporated therewith.

2. Description of the Prior Art

In automatic transmission motor vehicles of a type equipped with an electromagnetic clutch, there are usually installed near the accelerator pedal a clutch control switch and a pedal depression degree sensing switch. The clutch control switch senses a depression of the accelerator pedal for controlling the ON-OFF operation of the electromagnetic clutch and the pedal depression degree senses a depression degree of the accelerator pedal for changing the gear speeds of the automatic transmission.

One accelerator pedal devices of the above-mentioned type is shown in, for example, Japanese Utility Model Second Provisional Publication No. 59-21057. In this conventional pedal device, a pedal lever (viz., accelerator pedal proper) and an auxiliary lever are arranged to pivot about a common axis. The auxiliary lever has an upper end fixed to an accelerator cable, so that the pivotal movement of the auxiliary lever induces an axial movement of the accelerator cable to control the engine speed. A so-called "lost motion mechanism" is further arranged between the pedal lever and the auxiliary lever so that the pivotal movement of the auxiliary lever commences only when the pedal lever is depressed to pivot by a given angle relative to the auxiliary lever. A clutch control switch is incorporated with the lost motion mechanism, so that the ON operation of the clutch control switch is always effected prior to the opening movement of a throttle valve of the engine.

However, due to its inherent construction, the above-mentioned accelerator pedal device has the following drawback.

That is, due to a remarkable tensile force inevitably produced in the accelerator cable during the depression of the pedal lever, it is very difficult to obtain a highly timed operation of the clutch control switch with respect to the pivotal movement of the pedal lever. Thus, usually, a complicated adjusting mechanism is further employed for dealing with such drawback. However, employment of such a adjusting mechanism induces not only a complicated construction of the device but also increased production cost of the same.

SUMMARY OF THE INVENTION

It is therefore an object of the present invention to provide an accelerator pedal device which is free of the above-mentioned drawbacks.

It is another object of the present invention to provide an accelerator pedal device which is simple in construction and low in production cost.

According to the present invention, there is provided an accelerator pedal device for use with a fixed member. The accelerator pedal device comprises a support bracket adapted to be mounted on the fixed member; a stopper member adapted to be mounted to the fixed member; a pedal lever having a pivot shaft, the pivot shaft being rotatably supported by the support bracket; biasing means for biasing the pedal lever in such a given direction that an upper part of the pedal lever approaches the stopper member; a first auxiliary lever pivotally supported by the pivot shaft, the first auxiliary lever having a first upper portion which is located between the stopper member and the upper part of the pedal lever; a second auxiliary lever pivotally supported by the pivot shaft, the second auxiliary lever having a second upper portion which is located between the first upper portion and the upper part of the pedal lever; first lost-motion means which provides a lost-motion of a first given angle between the pedal lever and the second auxiliary lever; second lost-motion means which provides a lost-motion of a second given angle between the second and first auxiliary levers; a first switch which is actuated when an intersection angle between the pedal lever and the second auxiliary lever becomes smaller than the first given angle; and a second switch which is actuated when an intersection angle between the second and first auxiliary levers becomes smaller than the second given angle.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
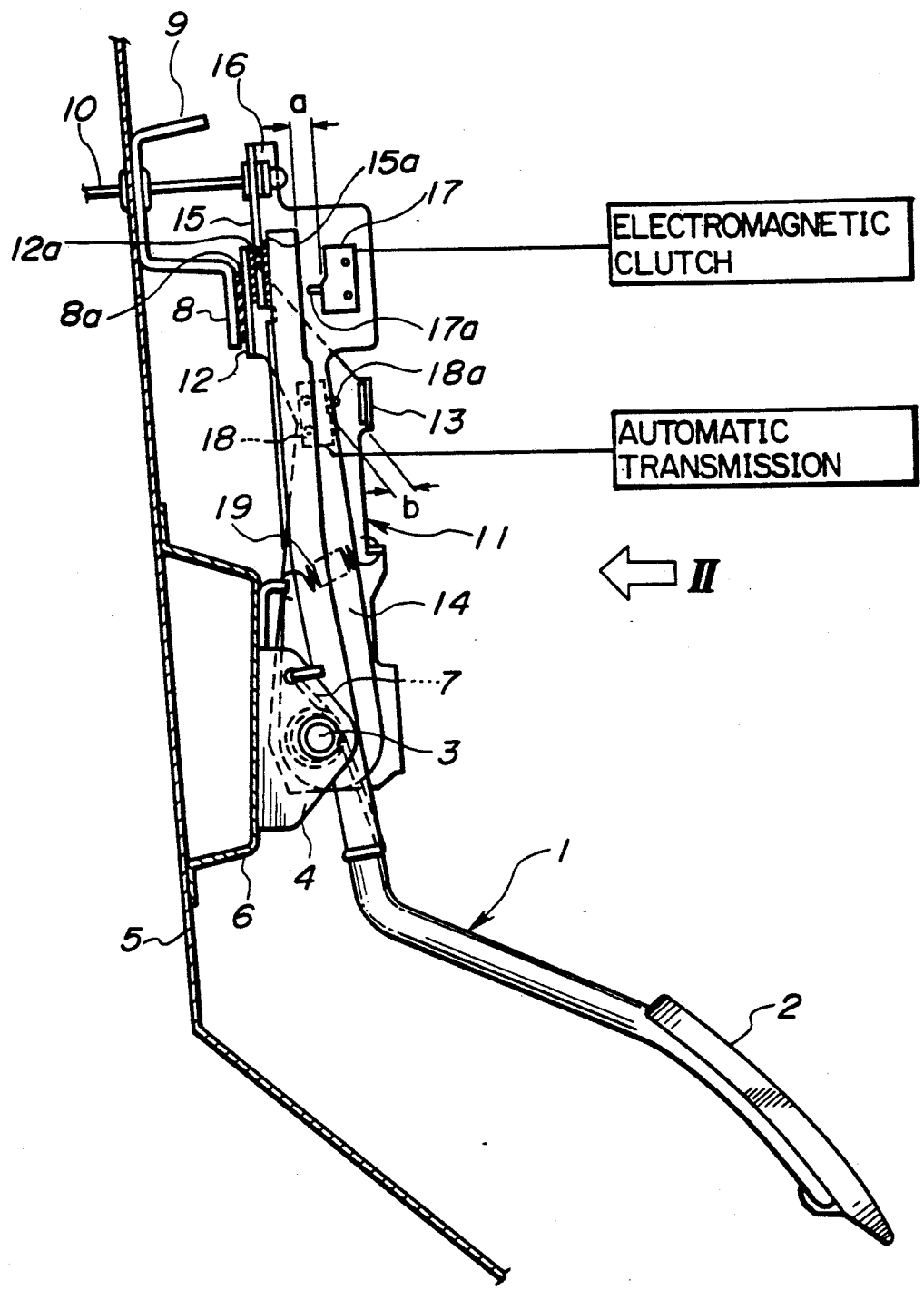
FIG. 1 is a side view of an accelerator pedal device according to the present invention.
Figure 2:
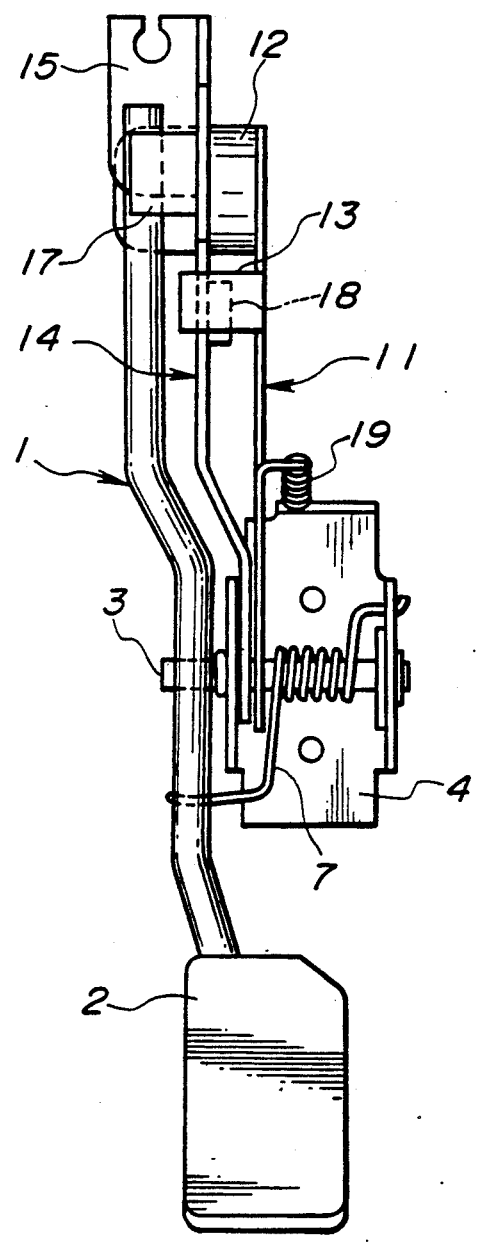
FIG. 2 is a front view taken from the direction of the arrow II of FIG. 1.

Referring to FIGS. 1 and 2, there is shown an accelerator pedal device according to the present invention.

In the drawings, designated by numeral 1 is a pedal lever (viz., accelerator pedal proper) which has a pad 2 mounted to a lower part thereof. As is well seen from FIG. 2, the pedal lever 1 has at its middle part a pivot shaft 3 fixed thereto. The pivot shaft 3 is pivotally held by a support bracket 4 which is securely mounted to a pedal mount bracket 6 (see FIG. 1) secured to a dash panel 5 of an associated motor vehicle. Although not shown in the drawings, bolts and nuts are used for securing the support bracket 4 to the pedal mount bracket 6.

As is seen from FIG. 2, between the pedal lever 1 and the support bracket 4, there is arranged a pedal return spring 7 which has a multi-turned portion spacedly received on the pivot shaft 3. With this return spring 7, the pedal lever 1 is biased in a counterclockwise direction in FIG. 1 about the axis of the pivot shaft 3, that is, in a direction to return a throttle valve (not shown) of an associated engine to a closed position.

As is seen from FIG. 1, to the dash panel 5 above the pedal mount bracket 6, there is secured a stopper bracket 9 which has a lower bent wall 8 serving as a stopper. The lower bent wall 8 is equipped at its rear face with a thin shock absorbing pad 8a. The dash panel 5 and the stopper bracket 9 have aligned bores (no numerals) through which an accelerator cable 10 passes. The accelerator cable 10 extends to the throttle valve of the engine.

Designated by numeral 11 is a first auxiliary lever which has a lower end pivotally disposed about pivot shaft 3 of the pedal lever 1. The first auxiliary lever 11 has an upper bent end 12 which is contactable with the shock absorbing pad 8a on the stopper wall 8 defined by the stopper bracket 9. As is understood from FIG. 2, the bent end 12 is normal to the major portion of the first auxiliary lever 11. The bent end 12 is equipped at its rear upper face with a thin shock absorbing pad 12a.

The first auxiliary lever 11 is formed at its upper rear portion with a switch actuating lug 13 which is bent normal relative to the major portion of the lever 11, as is seen from FIG. 2.

Designated by numeral 14 is a second auxiliary lever which, similar to the first auxiliary lever 11, has a lower end pivotally disposed about the pivot shaft 3. The second auxiliary lever 14 has an upper bent end 15 which is contactable with the shock absorbing pad 12a of the bent end 12 of the first auxiliary lever 11, as is understood from FIG. 1. The upper bent end 15 is normal to the major portion of the lever 14. The upper bent end 15 is equipped at its rear face with a shock absorbing pad 15a.

As is seen from FIG. 1, the upper bent end 15 of the second auxiliary lever 14 has the accelerator cable 10 connected thereto through a damping bush 16.

As is seen from FIG. 1, under a rest condition of the pedal lever 1, an upper portion of the same is pressed against the shock absorbing pad 15a of the upper bent end 15 of the second auxiliary lever 14. More specifically, under the rest condition of the pedal lever 1, the upper bent end 12 of the first auxiliary lever 11 is pressed against the stopper wall 8 of the stopper bracket 9, the upper bent end 15 of the second auxiliary lever 14 is pressed against the upper bent end 12 of the first auxiliary lever 11 and at the same time the upper portion of the pedal lever 1 is pressed against the upper bent end 15 of the second auxiliary lever 14. These pressed conditions are induced by the work of the pedal return spring 7.

A coil spring 19 extends between the first auxiliary lever 11 and the support bracket 4 to bias the lever 11 in a counterclockwise direction in FIG. 1, that is, in a direction to press the upper bent end 12 of the first auxiliary lever 11 against the stopper wall 8 of the stopper bracket 9.

A clutch control switch 17 is secured through bolts to the second auxiliary lever 14 in a manner to face forward toward an upper rear face of the pedal lever 1, and a pedal depression degree sensing switch 18 is secured through bolts to the second auxiliary lever 14 in a manner to face rearward toward the switch actuating lug 13 of the first auxiliary lever 11. Retractable antenna pins of these switches 17 and 18 are denoted by numerals 17a and 18a respectively. These pins 17a and 18a are spring-biased to project outward.

Accordingly, when the pedal lever 1 is depressed against the biasing force of the return spring 7, the clutch control switch 17 is actuated by the upper rear face of the pedal lever 1 and the pedal depression degree sensing switch 18 is actuated by the switch actuating lug 13 of the first auxiliary lever 11 in such a manner as will be described in detail hereinafter.

It is to be noted that the engagement of the pedal lever 1 with the clutch control switch 17, due to the depression of the pedal lever 1, induces a clockwise pivoting of the second auxiliary lever 14 about the pivot shaft 3 in FIG. 1, and the engagement of the switch actuating lug 13 with the pedal depression degree sensing switch 18 induces a clockwise pivoting of the first auxiliary lever 11 about the pivot shaft 3 in FIG. 1.

The clutch control switch 17 and the pedal depression degree sensing switch 18 are each housed in a robust plastic casing.

As is seen from FIG. 1, in the rest condition of the pedal lever 1, a small given clearance "a" is defined between the upper rear face of the pedal lever 1 and the face of the clutch control switch 17 on which the antenna pin 17a is located, and at the same time, another small given clearance "b" is defined between the face of the pedal depression degree sensing switch 18 on which the antenna pin 18a is located and the front face of the switch actuating lug 13.

It is to be noted that the clearance "b" is somewhat greater than the clearance "a".

When, in operation, the pad 2 of the pedal lever 1 is applied with an external force, the pedal lever 1 is pivoted about the axis of the pivot shaft 3 in a clockwise direction in FIG. 1 against the biasing force of the return spring 7. At an initial stage of this pivoting, only the pedal lever 1 is pivoted due to existence of the clearance "a". Thus, at this stage, the accelerator cable 10 fixed to the second auxiliary lever is not moved and thus opening operation of the throttle valve of the engine does not take place.

When the pedal lever 1 comes to a position where the upper rear face of the pedal lever 1 pushes the antenna pin 17a of the clutch control switch 17, the switch 17 is turned ON. With this, an initial depression stroke of the pedal lever 1 is sensed and thus a corresponding signal is applied to an associated electromagnetic clutch (not shown) to control the same. It is to be noted that the application of such signal to the clutch takes place prior to the opening operation of the throttle valve which will be described in the following.

Then when the pedal lever 1 is brought into contact with the face of the clutch control switch 17 keeping the switch 17 ON, the second auxiliary lever 14 is urged to pivot about the pivot shaft 3 in a clockwise direction in FIG. 1 together with the pedal lever 1. This clockwise pivoting of the second auxiliary lever 14 pulls the accelerator cable 10 thereby effecting the opening operation of the throttle valve of the engine.

When then the second auxiliary lever 14 comes to a position where the antenna pin 18a of the pedal depression degree sensing switch 18 is pushed by the switch actuating lug 13 of the first auxiliary lever 11, the switch 18 is turned ON and thus a corresponding control signal is applied to an associated automatic transmission to control the same.

Then, when, due to continuous pivoting of the pedal lever 1, the face of the pedal depression degree sensing switch 18 is brought into contact with the switch actuating lug 13 keeping the switch 18 ON, the first auxiliary lever 11 is urged to pivot about the pivot shaft 13 in a clockwise direction in FIG. 1 together with the second auxiliary lever 14. It is to be noted that this pivoting of the first auxiliary lever 11 is carried out against the biasing force of the coil spring 19. That is, under this condition, the pedal lever 1, the second auxiliary lever 14 and the first auxiliary lever 11 are forced to pivot like a single unit.

When now the external force is removed from the pad 2 of the pedal lever 1, the first auxiliary lever 11 is returned due to the force of the coil spring 19 to its rest position wherein the upper bent end 12 of the lever 11 is pressed against the stopper wall 8 of the stopper bracket 9, and at the same time, the pedal lever 1 is returned due to the force of the return spring 7 to its rest position together with the second auxiliary lever 14. That is, during the returning movement of the pedal lever 1, the upper front face of the lever 1 is brought into contact with the upper bent end 15 of the second auxiliary lever 14 thereby pivoting the lever 14 to its rest position.

In other words, when the external force is removed from the pedal lever 1, the pedal lever 1, the second auxiliary lever 14 and the first auxiliary lever 11 are urged to pivot like a single unit to their rest positions as shown in FIG. 1 due to the biasing forces of the return springs 7 and 19. Thus, during this return pivoting, the clutch control switch 17 and the pedal depression degree sensing switch 18 are turned OFF and the accelerator cable 10 is moved in a reversed direction thereby closing the throttle valve of the engine.

As is understood from the foregoing description, in the rest condition of the accelerator pedal device of the invention, the respective upper bent ends 12 and 15 of the first and second auxiliary levers 11 and 15 are both pressed against the stopper wall 8 of the stopper bracket 9 by the upper end of the pedal lever 1. This means that, under such rest condition, the small given clearance "a" between the pedal lever 1 and the clutch control switch 17 and the other small given clearance "b" between the pedal depression degree sensing switch 18 and the switch actuating lug 13 are kept assured or unchanged. Accordingly, even when a remarkable tensile force is produced in the accelerator cable 10, the relative positioning between the first and second auxiliary levers 11 and 14 is assuredly maintained, and thus, well-timed operations of the two switches 17 and 18 with respect to the pivoting movement of the pedal lever 1 are obtained.

Although, in the above, it is described that both the clutch control switch 17 and the pedal depression degree sensing switch 18 are secured to the second auxiliary lever 14, it is possible to secure such switches 17 and 18 to counter-levers (viz., the pedal lever 1 and the first auxiliary lever 11) of the second auxiliary lever 14.

What is claimed is:

1. An accelerator pedal device for use with a fixed member, said device comprising:
    a support bracket mounted on said fixed member;
    a stopper member mounted to said fixed member;
    a pedal lever having a pivot shaft, said pivot shaft being rotatably supported by said support bracket;
    biasing means for biasing said pedal lever in such a given direction that an upper part of said pedal lever approaches said stopper member;
    a first auxiliary lever pivotally supported by said pivot shaft, said first auxiliary lever having a first upper portion which is located between said stopper member and said upper part of said pedal lever;
    a second auxiliary lever pivotally supported by said pivot shaft, said second auxiliary lever having a second upper portion which is located between said first upper portion and said upper part of said pedal lever;
    first lost-motion means which provides a lost-motion of a first given angle between said pedal lever and said second auxiliary lever;
    second lost-motion means which provides a lost-motion of a second given angle between said second and first auxiliary levers;
    a first switch which is actuated when an intersection angle between said pedal lever and said second auxiliary lever becomes smaller than said first given angle; and
    a second switch which is actuated when an intersection angle between said second and first auxiliary levers becomes smaller than said second given angle.

2. An accelerator pedal device as claimed in claim 1, further comprising another biasing means which biases said first auxiliary lever in such a direction that said first upper portion approaches said stopper member.

3. An accelerator pedal device as claimed in claim 2, wherein said first lost-motion means comprises:
    a housing of said first switch, said housing being secured to said second auxiliary lever; and
    a given part of said pedal lever, said given part being contactable with said housing to induce an integral pivoting movement of said pedal lever and said second auxiliary lever about said pivot shaft.

4. An accelerator pedal device as claimed in claim 3, wherein said second lost-motion means comprises:
    a housing of said second switch, said housing being secured to said second auxiliary lever; and
    a given part of said first auxiliary lever, said housing of said second switch being contactable with said given part to induce an integral pivoting movement of said second and first auxiliary levers about said pivot shaft.

5. An accelerator pedal device as claimed in claim 4, wherein said first switch has an antenna pin which faces toward said given part of said pedal lever, and wherein said second switch has an antenna pin which faces toward said given part of said first auxiliary lever.

6. An accelerator pedal device as claimed in claim 5, wherein said second upper portion of said second auxiliary lever has an accelerator cable fixed thereto.

7. An accelerator pedal device as claimed in claim 1, wherein said biasing means is a coiled spring which is spacedly disposed about said pivot shaft with both ends respectively hooked to said pedal lever and said support bracket.

8. An accelerator pedal device as claimed in claim 2, wherein said another biasing means is a coil spring which extends between said first auxiliary lever and said support bracket.

9. An accelerator pedal device as claimed in claim 1, wherein said first switch is a clutch control switch which controls operation of an electromagnetic clutch and wherein said second switch is a pedal depression degree sensing switch which controls an automatic transmission.

10. An accelerator pedal device as claimed in claim 1, wherein said first switch is turned ON when the intersection angle between the pedal lever and the second auxiliary lever becomes smaller than said first given angle, and wherein said second switch is turned ON when the intersection angle between the second and first auxiliary levers becomes smaller than said second given angle.

11. An accelerator pedal device as claimed in claim 2, wherein said first lost-motion means includes:
    a housing of said first switch, said housing being secured to said pedal lever; and
    a given part of said second auxiliary lever, said given part being contactable with said housing to induce an integral pivoting movement of said pedal lever and said second auxiliary lever about said pivot shaft.

12. An accelerator pedal device as claimed in claim 11, wherein said second lost-motion means includes.
   a housing of said second switch, said housing being secured to said first auxiliary lever; and
   a given part of said second auxiliary lever, which is contactable with said housing of said second switch to induce an integral pivoting movement of said second and first auxiliary levers about said pivot shaft.

13. An accelerator pedal device for use with a fixed member, said device comprising:
   a support structure provided on said fixed member;
   a pedal lever pivotally supported by said support structure;
   biasing means for biasing said pedal lever in such a given direction that an upper part of said pedal lever approaches said fixed member;
   a first auxiliary lever pivotally supported by said support structure, said first auxiliary lever having a first upper portion which is located between said fixed member and said upper part of said pedal lever;
   a second auxiliary lever pivotally supported by said support structure, said second auxiliary lever having a second upper portion which is located between said first upper portion and said upper part of said pedal lever;
   first lost-motion means for providing a lost-motion of a first given angle between said pedal lever and said second auxiliary lever;
   second lost-motion means for providing a lost-motion of a second given angle between said second and first auxiliary levers;
   a first switch which is actuated when an intersection angle between said pedal lever and said second auxiliary lever becomes smaller than said first given angle; and
   a second switch which is actuated when an intersection angle between said second and first auxiliary levers becomes smaller than said second given angle.

* * * * *